United States Patent [19]

Mochizuki et al.

[11] Patent Number: 5,505,971

[45] Date of Patent: Apr. 9, 1996

[54] PROCESS FOR THE MANUFACTURE OF EXPANDED HOLLOW CONFECTIONERY

[75] Inventors: Keizo Mochizuki, Sakado; Shinichi Makishima, Fujieda; Yuji Shimamoto, Sakado, all of Japan

[73] Assignee: Meiji Seika Kaisha, Ltd., Tokyo, Japan

[21] Appl. No.: 164,947

[22] Filed: Dec. 10, 1993

[30] Foreign Application Priority Data

Dec. 15, 1992 [JP] Japan ............... 4-334238

[51] Int. Cl.⁶ ............................ A21D 13/08
[52] U.S. Cl. ............ 426/281; 426/94; 426/282; 426/283; 426/549; 426/559; 426/660
[58] Field of Search ............ 426/94, 281, 282, 426/283, 559–660, 549

[56] References Cited

U.S. PATENT DOCUMENTS

| | | | |
|---|---|---|---|
| 3,615,675 | 10/1971 | Wisdom et al. | 99/83 |
| 4,053,650 | 10/1977 | Chino et al. | 426/304 |
| 4,275,082 | 6/1981 | Douean | 426/92 |
| 4,562,080 | 12/1985 | Tenn | 426/94 |
| 4,661,360 | 4/1987 | Smith | 426/94 |
| 4,873,093 | 10/1989 | Fazzolare et al. | 426/28 |
| 4,948,602 | 8/1990 | Boehm et al. | 426/94 |
| 5,145,699 | 9/1992 | Dijkshoorn et al. | 426/94 |
| 5,268,187 | 12/1993 | Quinlan | 426/496 |

FOREIGN PATENT DOCUMENTS

| | | |
|---|---|---|
| 58-51845 | 3/1983 | Japan . |
| 61-11573 | 4/1986 | Japan . |

*Primary Examiner*—Donald E. Czaja
*Assistant Examiner*—Lien Tran
*Attorney, Agent, or Firm*—Nikaido, Marmelstein, Murray & Oram

[57] ABSTRACT

A process for the manufacture of an expanded hollow confectionery which allows charging of an fatty confectionery dough by an injection method. The expanded hollow confectionery is prepared by charging raw materials of grain flour, starch, seasoning and water into a steam-processing machine to prepare a steam-boiled dough, charging the steam-boiled dough into a mixer to stir the same for entrapping air therein, shaping the air-entrapped dough into a sheet, overlapping the dough sheet on another dough sheet, stamping the double-layered dough sheet to obtain flat dough pieces, drying the dough pieces, so that specific gravity of the pieces becomes 1.18–1.25, and then heating the dried pieces to cause expansion thereof.

3 Claims, No Drawings

PROCESS FOR THE MANUFACTURE OF EXPANDED HOLLOW CONFECTIONERY

BACKGROUND OF THE INVENTION

1. Field of the Invention

The present invention relates to a process for the manufacture of an expanded hollow confectionery and more particularly, to the confectionery which allows charging of a fatty confectionery dough by an injection method and gives crispy and light taste or tooth feeling.

2. Related Arts

There was a conventional process for the manufacture of an expanded hollow confectionery accommodating therein an fatty confectionery dough such as a chocolate dough, fatty cream or the like, which comprises steps of kneading raw materials of grain such as wheat flour, seasonings and water to prepare a dough for biscuits, shaping the dough into a sheet, overlapping the dough sheet on another dough sheet substantially same to the former, cutting the double-layered dough sheet into pieces with a suitable size, baking the pieces to obtain expanded hollow confectioneries, and injectional charging the fatty confectionery dough therein.

While, Jap. Pat. No. Sho 61 (A. D. 1986)-11573(B) discloses a process for the manufacture of an expanded confectionery, which comprises steps of firstly coating alternately with a starch containing expandable mixture and an aqueous sugar syrup a surface of core material such as nuts, an expanded hollow starch product coated with a fatty confectionery dough or a formed fatty confectionery dough, secondly coating alternately with a mixture which contains another starch higher in expansion ratio than that in the first mixture and another aqueous sugar syrup which is higher in Brix concentration than the first syrup, and frying the coated product.

The former product gives a crunchy and heavy taste, since the expanded hollow body has been formed by baking the dough for biscuits. The frying technique as employed in said patent literature can be utilized for manufacturing an expanded hollow confectionery per se. However, the expanded hollow confectionery shall be broken, when a hollow needle is penetrated thereto for charging the fatty confectionery dough having fluidity at room temperature, and thus it is impossible to prepare a desired product.

SUMMARY OF THE INVENTION

Therefore, an object of the invention is to provide a process for the manufacture of an expanded hollow confectionery with not crunchy but crispy and light taste, which allows charging therein a fatty confectionery dough by a hollow needle and without cause any breakage of the hollow expanded body.

Another object of the invention is to provide a process for the manufacture of an expanded hollow confectionery with a crispy and light taste and charged therein a fatty confectionery dough.

The inventors have energetically studied and investigated for attaining the objects, while paying their attention mainly to a preparation of a stamped and dried dough pieces with a suitable specific gravity by controlling an amount of preparing water, vapor pressure and other factors, when a raw material mixture of grain flour, starch, seasonings and water shall be steam-processed to prepare a steam-boiled dough, whereby the invention has been established.

According to the invention, the first object can be attained by a process which comprises steps of steam-processing a raw material mixture of a grain flour, starch, seasoning and water to prepare a steam-boiled dough, charging the dough into a mixer with a rotary blade to stir the dough for entrapping air therein, shaping the dough into a sheet, overlapping the dough sheet on another dough sheet prepared by the same manner as above, stamping the double-layered dough sheet to prepare flat dough pieces, drying the dough pieces to obtain pellets, and heating the pellets by heated air to cause an expansion thereof.

The second object of the invention can be attained by injectionally charging a fatty confectionery dough into each of the expanded hollow products obtained as above, by a hollow needle.

As the grain flour, wheat flour, rye flour, rice flour or the like can be used. As the starch, potato starch, wheat starch, corn starch and the like can be listed. As the seasonings, an amino acid seasoning, sugar, table salt and the like can be employed. These raw materials inclusive of preparing water are charged into a steam-processing machine having single shaft with a rotary blade and of the type that the steam shall be supplied therein from outside thereof.

It is preferable to set the preparing water in an amount of 45 less than 60 parts by weight based on 100 parts by weight in total of the other raw materials, since in case of less than 45 parts by weight, it is impossible to sufficiently entrap air in the dough and in case of 60 or more than 60 parts by weight, resulting dough is too soft to make difficult the shaping the dough into the sheet.

The inventors have checked influences of an amount of preparing exerting to various factors to obtain results shown in following Table 1.

TABLE 1

| Preparing water (parts by weight) | Specific gravity of pellets | Amount of entrapped air (parts by volume) | Sheet shaping situation | Possibility on production |
| --- | --- | --- | --- | --- |
| 40 | 1.28 | 1.56 | Good | No good |
| 43 | 1.27 | 2.36 | Good | No good |
| 45 | 1.25 | 4.00 | Good | Good |
| 50 | 1.24 | 4.83 | Good | Good |
| 55 | 1.20 | 8.33 | Good | Good |
| 58 | 1.18 | 10.17 | Good | Good |
| 60 | 1.17 | 11.11 | No good | No good |

In Table 1, the amount of preparing water is shown based on 100 parts by weight in total of the other raw materials. The specific gravity and amount of air entrapped by the dough shall be explained below.

In the first place, the raw materials having a composition shown in Table 3 given later and a given specific amount of preparing water were charged into a steam-processing machine having single shaft with a rotary blade to steam-process the raw materials for 18 minutes, while rotating the blade at peripheral velocity of 380 m/min and supplying steam of 4 kg/cm$^2$ in gauge pressure (hereinafter, the value of vapor pressure is given by "gauge pressure", although it shall not referred to so). The resulting steam-processed dough was charged into a conventional mixer having single shaft with a rotary blade to entrap air in the dough for 2 minutes, while rotating the blade at peripheral velocity of 310 m/min. The resulting air-entrapped dough was shaped into a sheet having thickness of 1.2 mm and the dough sheet was overlapped on another dough sheet by the same method as above, and the overlapped dough sheet is stamped to obtain double-layered dough pieces. The dough pieces were dried by hot air at 50° C. Each of the resulting dried dough pieces was named as the "pellet". Pellets entrapping no air therein were also prepared by repeating above process but omitting the air entrapping step.

The specific gravity of the pellets was determined by pouring the pellets into aqueous table salt solutions, each of which solutions is different in its specific gravity by 0.02 by adjusting the concentration of the table salt therein and observing its state of rise and fall in each of the solutions.

The amount of air entrapped in the pellet was determined according to following equation.

$$V \text{ (parts by volume)} = (G_1 - G_2)/G_2 \times 100$$

V: Amount of air entrapped in pellet, $G_1$: Specific gravity of pellet entrapping no air, and $G_2$: Specific gravity of pellet entrapping air therein.

The sheet shaping situation in Table 1 means a workability in steps for forming the dough sheet by passing the dough between shaping rolls and drying the dough sheet. Namely, the evaluation thereon was given as "good", when the air-entrapped dough can be shaped into the sheet without adhering to the shaping rolls and subsequent drying conveyor. The judgement on production possibility was given as "good", when the pellets were baked to prepare expanded hollow products showing a hardness in a suitable range to allow an injectional charging of a fatty confectionery dough without causing any damage such as breakage.

It is preferable to supply the steam of 3–5 kg/cm$^2$ into the steam-processing machine for 6–20 minutes, since in case of lower than 3 kg/cm$^2$, the dough is not sufficiently treated to give a lower expansion ratio in the baking step, and it is not preferable to set the pressure higher than 5 kg/cm$^2$ from view points of safety and economy, although the treatment can be carried out under such a vapor pressure condition. When the steam-processing time period is shorter than 6 minutes, the dough can not sufficiently be treated to give a lower expansion ratio, and while in case of longer than 20 minutes, there was found a tendency of lowering in expansion ratio.

Following Table 2 shows relations of processing time period, vapor pressure, and expansion ratio of the baked pellets.

TABLE 2

| Vapor pressure (kg/cm$^2$) | Steam-processing time period (minutes) | Expanded size (mm) |
| --- | --- | --- |
| 2.5 | 10 | 12 |
| 2.5 | 20 | 13 |
| 2.5 | 30 | 13 |
| 3.0 | 10 | 18 |
| 3.0 | 15 | 19 |
| 3.0 | 20 | 20 |
| 3.0 | 25 | 19 |
| 4.0 | 4 | 13 |
| 4.0 | 6 | 21 |
| 4.0 | 10 | 22 |
| 4.0 | 15 | 24 |
| 4.0 | 18 | 27 |
| 4.0 | 20 | 22 |
| 4.0 | 25 | 16 |
| 4.5 | 4 | 15 |
| 4.5 | 6 | 23 |
| 4.5 | 15 | 26 |
| 4.5 | 22 | 17 |
| 5.0 | 4 | 17 |
| 5.0 | 15 | 24 |
| 5.0 | 22 | 17 |

Pellet samples were prepared by charging the raw materials in a composition in following Table 3, steam-processing the same under the conditions shown in Table 2, stirring the steam-processed dough to entrap air therein as referred to before, shaping the air-entrapped dough into a sheet having a thickness of 1.2 mm, overlapping the dough sheet on another dough sheet prepared in the same method as above, stamping the double-layered dough sheet to obtain disc-like dough pieces having a diameter of 23 mm, and drying the dough pieces to obtain the pellets lets having water content of 11% by weight.

The pellets were charged into an air-jet type expanding machine (Type FM-8816, manufactured by Arakawa Tekko Kabushiki Kaisha) and expanded by heated air at 240° C. The expanded size given in Table 2 is the diameter of the resulting roundly expanded hollow products.

TABLE 3

| Raw material | Amount (parts by weight) |
| --- | --- |
| Wheat flour | 69 |
| Corn starch | 22 |
| Table salt | 1 |
| Sugar | 8 |
| Preparing water | 50 |

When results shown in Tables 1 and 2 are taken into consideration, it is preferable that a) the steam of 3–5 kg/cm$^2$ is supplied into the steam-processing machine for 6–20 minutes;

b) the pellet has a specific gravity in a range of 1.18–1.25; and c) the pellet entraps air therein 4–10.17 parts by volume based on 100 parts by volume of the pellet. Following Table 4 shows relations of existence or none-existence of the air entrapping step, specific gravity of the pellet, amount of air entrapped in the pellet and hardness of the expanded hollow product.

TABLE 4

| Steam-Processing conditions | | Air-entrapping treatment | Specific gravity of pellets | Amount of entrapped air (parts by volume) | Hardness of expanded hollow product (g-weight) |
|---|---|---|---|---|---|
| Pressure (kg/cm²) | Time (min.) | | | | |
| 3.0 | 10 | Yes | 1.20 | 8.33 | 400 |
| 3.0 | 15 | Yes | 1.18 | 10.17 | 400 |
| 3.0 | 20 | Yes | 1.18 | 10.17 | 400 |
| 3.0 | 20 | No | 1.30 | 0.0 | 1300 |
| 4.0 | 6 | Yes | 1.18 | 10.17 | 400 |
| 4.0 | 6 | Yes | 1.25 | 4 | 600 |
| 4.0 | 10 | Yes | 1.20 | 8.33 | 440 |
| 4.0 | 15 | Yes | 1.15 | 16.52 | 250 |
| 4.0 | 18 | Yes | 1.17 | 10.26 | 380 |
| 4.0 | 19 | Yes | 1.18 | 10.17 | 410 |
| 4.0 | 10 | No | 1.30 | 0.0 | 1350 |
| 4.5 | 6 | Yes | 1.18 | 10.17 | 410 |
| 4.5 | 6 | Yes | 1.16 | 12.07 | 330 |
| 4.5 | 15 | Yes | 1.18 | 10.17 | 400 |
| 4.5 | 15 | No | 1.30 | 0.0 | 1340 |
| 3.0 | 20 | Yes | 1.10 | 18.18 | 210 |
| 4.0 | 18 | Yes | 1.10 | 18.18 | 200 |
| 4.5 | 15 | Yes | 1.11 | 17.17 | 250 |
| 4.0 | 18 | Yes | 1.27 | 2.36 | 750 |

The hardness shown in Table 4 was measured by a rheometer (Type NRM-201J-CW, manufactured by Fudo Kogyo Kabushiki Kaisha), to which a hollow needle having a diameter of 2 mm was mounted and was moved at velocity of 30 mm/min to penetrate s body of the expanded hollow product. Other Items are same with those as referred to hereinbefore.

From the results shown in Table 4, it can be be seen that a) the expanded hollow products show too light taste to give no crispy one, when pellets therefor had the specific gravity of less than 1.18 and entrapped air of more than 10.17 parts by volume;

b) when the pellets had the specific gravity of more than 1.25 and the entrapped air of less than 4 parts by volume, no product can be obtained, since a penetration of the hollow needle for charging a fatty confectionery dough causes breakage of the expanded hollow body;

c) the expanded hollow products prepared by using the pellets having specific gravity of 1.15 have hardness of 250 g-weight to give no crispy taste;

d) when the pellets had the specific gravity in a range of 1.18–1.25, the expanded hollow products have hardness of 400–600 g-weight to give desired crispy taste, and allow an injectional charging of a fatty confectionery dough without causing breakage of the expanded hollow body; and e) when the pellets had the specific gravity more than 1.25, the expanded hollow products have hardness of higher than 600 g-weight and do not allow the injectional charging of the fatty confectionery dough, since the penetration of injection needle therefor may cause breakage of the expanded hollow body to decrease yield of the product.

The relation between the hardness and anti-impacting ability of expanded hollow products was checked from such a situation that when the fatty confectionery dough is injectionally charged into the expanded hollow body by a hollow needle having a diameter of 3 mm, and then the expanded hollow products charged the fatty confectionery dough therein were given to a professional panel (30 persons) to carry out a functional test on liking of the products. Evaluation of the functional test was judged based on following standards.

Score:

5: Having desired crispy taste and excellent in liking,

4: Having desired crispy taste and good in liking,

3: Having crispy taste and ordinary in liking,

2: Having somewhat crispy taste and not good in liking, and

1: Having no crispy taste and bad in liking.

Results are shown in following Table 5.

TABLE 5

| Hardness (g-weight) | Functional Evaluation | | Anti-Impacting ability |
|---|---|---|---|
| | Score | Opinion | |
| 250 | 2.0 | Softy, weak crispy taste | Yes |
| 400 | 4.5 | Nice crispy taste, and excellent in liking | Yes |
| 500 | 4.8 | Nice crispy taste, and excellent in liking | Yes |
| 600 | 4.3 | Nice crispy taste, and excellent in liking | Yes |
| 750 | 2.5 | Hard taste, and not in liking | No |
| 1300 | 1.0 | Too hard and fragile, and bad in liking | No |

In the Table,

The score is given with mean value, and

"Yes" and "No" in the Item of—Anti-impacting ability—means that 3 or less and 30 or more expanded hollow bodies were broken among 100 bodies, respectively, when the hollow needle was penetrated for charging therein the fatty confectionery dough.

DETAILED DESCRIPTION OF THE PREFERRED EMBODIMENT

The invention will now be further explained in more detail and concretely with reference to Examples.

EXAMPLE 1

Raw materials of wheat flour (68 parts by weight), corn starch (22 parts by weight), table salt (1 part by weight), sugar (8 parts by weight) and water (50 parts by weight) were charged into a steam-processing machine (Type 10K, manufactured by Kabushiki Kaisha Yamamoto Seisakusho) having single shaft with a rotary blade, and steam with vapor pressure of 4 kg/cm$^2$ was supplied to the machine for 18 minutes, while rotating the blade at periphery velocity of 380 m/min. Resulting steam-processed dough was poured into a mixer having single shaft with a rotary blade for stirring the dough 5 minutes to entrap air therein. Then, the resulting air-entrapped dough was passed through a gap of two rolls to shape the dough into a sheet having thickness of 1.2 mm. The dough sheet was overlapped on another dough sheet prepared by same method with the former sheet. The double-layered dough sheet was stamped by a stamping cutter to obtain disk-like flat dough pieces having a diameter of 23 mm. The dough pieces were dried by hot air at 50° C. to obtain dried pellets having water content of 11% by weight. A specific gravity of the pellets was measured with use of aqueous table salt solutions different in its specific gravity to find as 1.18.

The dried pellets were charged into a air-jet type expanding machine (Type FM-8816, manufactured by Arakawa Tekko Kabushiki Kaisha) and treated by air heated at 240° C. for 40 seconds to obtain roundly expanded hollow products. To each of the products, a chocolate dough was injectionally charged by a hollow needle having a diameter of 3 mm, which did not cause any breakage of the expanded hollow body. The hardness of the final product was measured by using a rheometer (Type NRM-201J-CW, manufactured by Fudo Kogyo Kabushiki Kaisha) with a needle having a diameter of 2 mm and moving at a velocity of 30 mm/min to penetrate into the body of expanded hollow product. The measurement showed the hardness of 400 g-weight.

A sampling of the products showed that those have excellent crispy and light taste.

EXAMPLE 2

Raw materials of rye flour (39 parts by weight), wheat flour (30 parts by weight), corn starch (22 parts by weight), table salt (1 part by weight), sugar (8 parts by weight) and water (50 parts by weight) were treated by the process as described in Example 1 to obtain dried pellets, excepting that the air-entrapping operation was carried out for 2 minutes. The pellets showed a specific gravity of 1.25 and an entrapped air amount of 4 parts by volume.

The pellets was subjected to the expansion procedure as described in Example 1 to obtain expanded hollow products having hardness of 600 g-weight and the resulting expanded hollow products have withstood to the impact due to injectional charging of a chocolate dough to obtain desired products with crispy taste.

What is claimed is:

1. A process for the manufacture of an expanded hollow confectionery, comprising steps of steam-processing a raw material mixture of a grain flour, starch, seasoning and water to prepare a steam-boiled dough, charging the dough into a mixer with a rotary blade to stir the dough for entrapping air therein, shaping the dough into a sheet, overlapping the dough sheet on another dough sheet prepared by the same manner as above, stamping the double-layered dough sheet to prepare flat dough pieces, drying the dough pieces to obtain pellets, heating the pellets by heated air to cause an expansion thereof and injectionally charging a fatty confectionery dough into the expanded hollow confectionery by a hollow needle, a specific gravity of said pellets being in a range of 1.18–1.25 through said step of entrapping air into the steam-boiled dough and said step of drying the flat dough pieces.

2. A process as claimed in claims 1, wherein an amount of the water is 45 or more parts by weight but less than 60 parts by weight based on 100 parts by weight of raw materials other than water.

3. A process as claimed in claim 1, wherein said steam-processing step of the raw materials is carried out by supplying steam at 3–5 kg/cm$^2$ in gauge pressure for 6–20 minutes.

* * * * *